United States Patent [19]

Ozawa et al.

[11] Patent Number: 4,847,610

[45] Date of Patent: Jul. 11, 1989

[54] METHOD OF RESTORING TRANSMISSION LINE

[75] Inventors: Kazuyuki Ozawa; Akira Watanabe, both of Kanagawaken, Japan

[73] Assignee: Mitsubishi Denki K.K., Tokyo, Japan

[21] Appl. No.: 77,518

[22] Filed: Jul. 24, 1987

[30] Foreign Application Priority Data

Jul. 31, 1986 [JP] Japan .................................. 61-180470
Jul. 31, 1986 [JP] Japan .................................. 61-180471

[51] Int. Cl.⁴ .............................................. H04Q 9/00
[52] U.S. Cl. ........................ 340/825.160; 340/825.050; 370/16; 371/11
[58] Field of Search ..................... 340/825.16, 825.05; 370/13–16, 88; 371/11

[56] References Cited

U.S. PATENT DOCUMENTS

| | | | |
|---|---|---|---|
| 4,190,821 | 2/1980 | Woodward | 370/88 |
| 4,527,270 | 7/1985 | Sweeton | 371/11 |
| 4,709,365 | 11/1987 | Beale et al. | 371/11 |
| 4,710,915 | 12/1987 | Kitahara | 370/16 |
| 4,723,241 | 2/1988 | Grobel et al. | 371/11 |
| 4,763,315 | 8/1988 | Nakayashiki et al. | 370/16 |

FOREIGN PATENT DOCUMENTS 2435299 5/1985 Fed. Rep. of Germany .
2133952 8/1984 United Kingdom .

OTHER PUBLICATIONS

ISO/TC97/SC13 N 348 Rev. 1, "Fiber Distributed Data Interface Media Access Control"(MAC), 02-2-8-86.

Primary Examiner—Donald J. Yusko
Assistant Examiner—Edwin C. Holloway, III
Attorney, Agent, or Firm—Takeuchi Patent Office

[57] ABSTRACT

When a trouble occurs on a transmission line, each station transmits a predetermined frame to the adjacent station. The station which does not receive the frame outputs to the adjacent downstream station a frame instructing that its primary output be looped back to its secondary input. The information transmission trouble is removed by arranging the responses to the frames by the respective stations and the transmission procedure.

4 Claims, 6 Drawing Sheets

FIG. 5
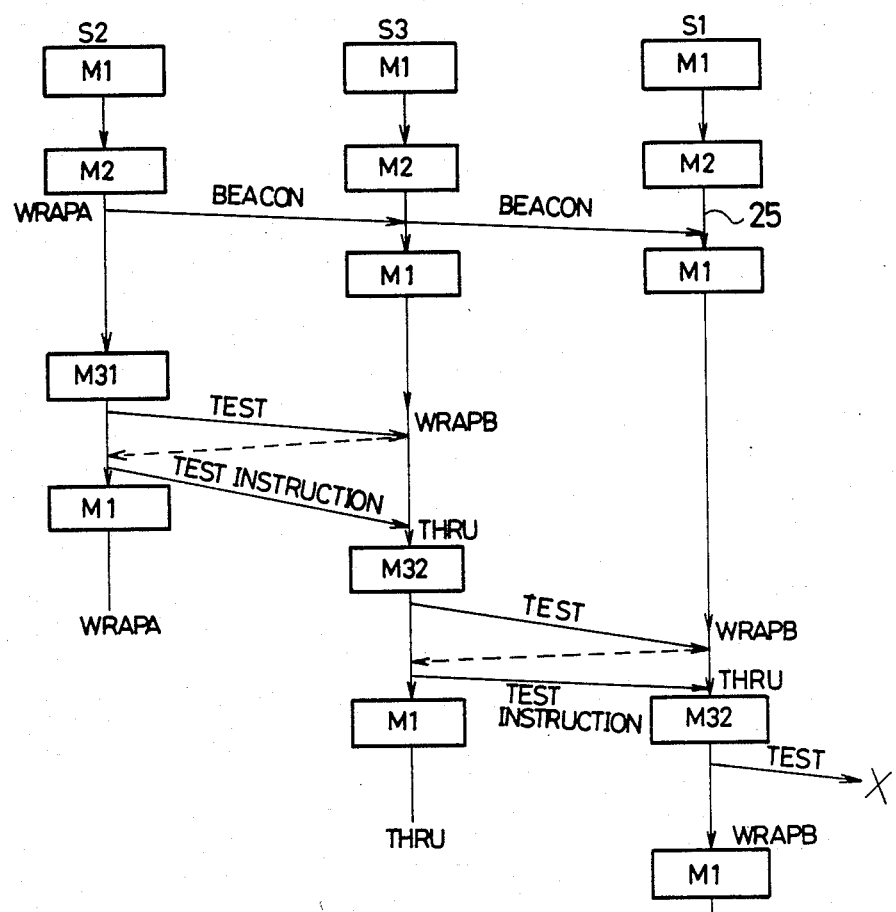
PRIOR ART  FIG. 6
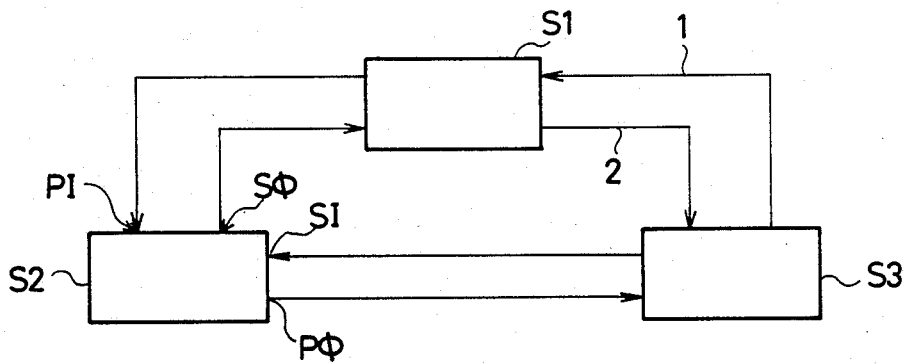

METHOD OF RESTORING TRANSMISSION LINE

BACKGROUND OF THE INVENTION

1. Field of the Invention

The present invention relates to a method of restoring a dual transmission line which connects respective stations to make a local-area network.

2. Description of the Prior Art

FIG. 6 shows a conventional ring local area network having three stations S1, S2, and S3 connected to each other with a primary transmission line 1 and a secondary transmission line 2 at respective primary and secondary input and output terminals PI, PO, SI, and SO. Each station has a computer and other equipment, and these machines are able to communicate each other through the stations. The data are circulated along the ring transmission line in the direction of an arrow. Normally, only the primary line 1 is used, with the secondary line 2 standing by for use when the primary line has a fault.

FIG. 7 shows the fields of a frame which flows in a ring local-area network such as shown in FIG. 6. This frame has a start delimiter SD indicating the beginning of the frame, a destination station address DA, a source station address SA, a command C indicating the frame type, a user data I to be added if necessary, a frame check sequence FCS for detecting a frame error, an end delimiter ED indicating the end of the frame, and a frame status FS indicating the response.

For example, the station 2 transmits a frame of respective fields SD through ED at the primary output PO on the primary transmission line 1. The frame is circulated along the primary line 1 and returned to the same station 2 at the primary input PI, where it is discarded. The other station S1 or S3 constantly monitors the frame on the primary line 1 while repeating it and captures the contents of the frame addressed to the station and transmits the result of the capture in the FS field. The transmitting station S2 checks the FS field to see whether the transmission is completed. The transmitting station must obtain the right to transmit according to the procedure determined by the system, but this procedure has nothing to do with the present invention and its description will be omitted.

A conventional method of restoring a transmission line will be described with reference to FIG. 8 in which the primary line 1 is broken between the stations S1 and S2. When the primary line 1 is broken between the stations S1 and S2 causing a fault and the station S2 detects the carrier breakdown at the primary input PI on the primary line 1, it connects the primary input PI to the secondary output SO and transmits without interruption through the secondary line 2 to the adjacent station S1 a special symbol instructing that the primary output PO be connected to the secondary input SI. The station S1 receives the special symbol at the secondary input SI on the secondary line 2 and connects its primary output PO to its secondary input SI as instructed. In this way, the transmission line of the ring local-area network is restored to continue communications.

The condition that the secondary output is connected to the primary input is hereinafter called a "WRAPA" state, that the primary output is connected to the secondary input, a "WRAPB" state, both WRAPA and WRAPB states, generally a "wrap" or "loopback" state, and the other or non-loopback condition, a "THRU" state.

In the above example, the transmission line is completely broken to cause a carrier breakdown, but there is another kind of fault that only the contents of information are broken without causing a carrier breakdown (hereinafter called "information transmission fault"). At present, there is no method of restoring a transmission line from such a fault, but only the fault location is able to evaluate.

A conventional method of evaluating a fault location will be decribed with reference to FIG. 9. Each station S1, S2, or S3 has a nomal mode 11 and a beacon mode 12. In the normal mode, when there is no information transmission trouble on the transmission line, each station performs a normal transmission reception operation while monitoring a control symbol which is generated on the transmission line in a predetermined period of time. In the beacon mode, when a fault occurs on the transmission line, a station detects the fault by monitoring the control symbol and transmits to the adjacent downstream station a beacon frame indicating the transmission fault. When the station in the beacon mode receives the beacon frame, it returns to the normal mode.

A method of restoring a transmission line from an information transmission fault will be described with reference to FIG. 10. When a fault occurs on the primary line 1 between the stations S1 and S2, the respective stations in a normal mode are unable to detect a control symbol within a predetermined period of time and go to a beacon mode about the same time. The respective stations S1, S2, and S3 in the beacon mode transmits a beacon frame to the adjacent downstream station as indicated by a broken line 100. The station S3 receives the beacon frame from the station S2 to return to the normal mode, and the station S1 receives the beacon frame from the station S3 to return to the normal mode, but the station S2 is unable to receive the beacon frame from the station S1 because of the information transmission fault on the transmission line 1 and remains in the beacon mode. Hence, the system is brokendown, but it is only possible to judge that the fault location lies between the stations S2 in the beacon mode and its upstream station S1. In the above beacon frame, the DA and FS fields are insignificant and the I field does not exist.

As has been described above, the conventional method of restoring a transmission line is able to correct a carrier breakdown but unable to correct an information transmission fault without carrier breakdown except for providing an approximate fault location.

SUMMARY OF THE INVENTION

It is an object of the invention to provide a method of restoring a transmission line from an information transmission fault.

It is another object of the invention to provide a method of restoring a transmission line from an information transmission fault by the minimum procedure.

It is still another object of the invention to provide a method of restoring a transmission line from an information transmission fault resulting from a trouble in the station.

According to the invention, respective stations in respective modes exchange with the adjacent upstream or downstream station a frame corresponding to the mode so as to restore the transmission line from an information transmission fault.

Other objects, features, and advantages of the invention will be apparent from the following description taken in conjunction with the accompanying drawings.

BRIEF DESCRIPTION OF THE DRAWINGS

FIG. 5 is a schematic diagram useful for explaining a process of restoring the transmission line of the system of FIG. 4.

FIG. 6 is a schematic diagram of a conventional local area network.

DESCRIPTION OF THE PREFERRED EMBODIMENTS

Figure 1:
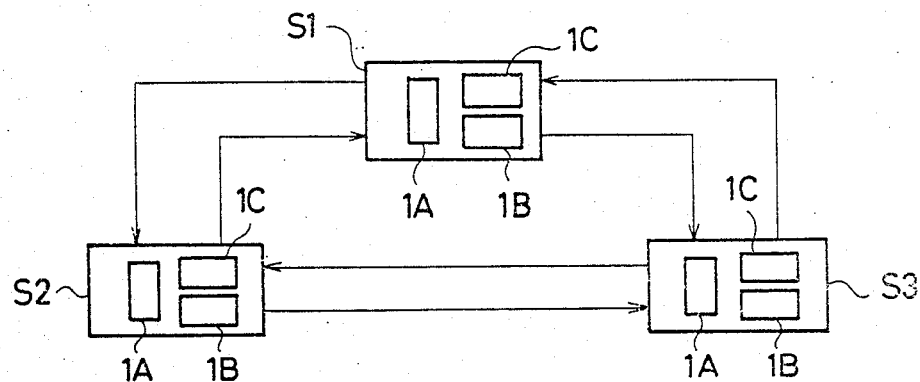
FIG. 1 is a block diagram of a system embodying the present invention.

Referring now FIG. 1 there is shown a system embodying the present invention, which has three stations S1, S2, and S3. Each station has a mode switching means 1A, a control circuit 1B for controlling the mode switching means 1A and effecting loopback or release of the loopback and a timer 1C for measuring time. In this embodiment, each station has five modes; normal, beacon, test, and configuration instruction modes 1 and 2.

In the normal mode, a station performs a normal transmission reception operation while monitoring a control symbol. In the beacon mode, a station outputs a beacon frame indicating that the transmission line has a fault. In the test mode, a station loops back the primary output to the secondary input and outputs to the adjacent upstream station a test frame indicating that the transmission line is now in order. In the configuration instruction mode 1, a station loops back the secondary output to the primary input and outputs to the adjacent downstream station a configuration instruction frame instructing that the primary output be looped back to the secondary input. In the configuration instruction mode 2, a station releases the loopback of the primary output to the secondary input for making a THRU sate and outputs the above configuration instruction frame.

Figure 2:
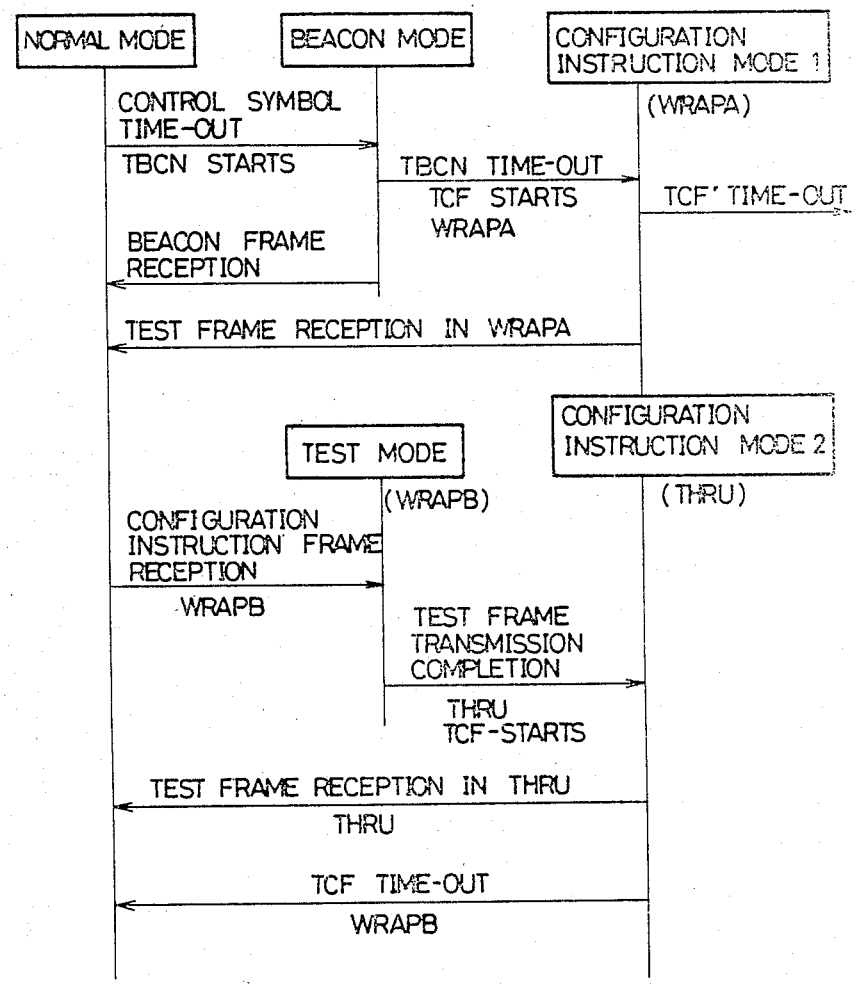
FIG. 2 is a schematic diagram showing the operational modes of the system of FIG. 1.

How a station chages its operational mode will be described with reference to FIG. 2. When a control symbol is unable to detect in a predetermined period of time in the normal mode (control symbol time-out), each station goes to a beacon mode. When a station in the beacon mode receives no beacon frame from other stations in the beacon mode in a predetermined period of time (beacon mode time-out), the station goes to a configuration instruction mode 1 in a WRAPA state and outputs a configuration instruction frame. When a station in the beacon mode receives a beacon frame from another station in the predetermined time, the station returns to the normal mode.

When a station in the normal mode receives a configuration instruction frame after a fault has been detected, the station goes to a test mode in a WRAPB state. When the station in the test mode completes the transmission of a test frame, it releases the WRAPB state into the THRU state going to the configuration instruction mode 2.

When the station in the configuration instruction mode 2 receives a test frame, it returns to the normal mode as it is in the THRU state. When the configuration instruction mode 2 continues for the predetermined time (configuration mode 2 time-out), the station returns to the normal mode in a WRAPB state. When the configuration instruction mode 1 continues for a predetermined time (configuration mode 1 time-out), the station releases itself from the local-area network.

The control means 1B controls the switching means 1A to effect the above mode transition. The timer 1C measures time for the time-outs. When a new station is added to the local area network or a station is bypassed and removed from the local area network, the transmission line is disturbed temporarily and the recovery takes some time so that the period of time-out has been determined taking it into consideration.

Figure 3:
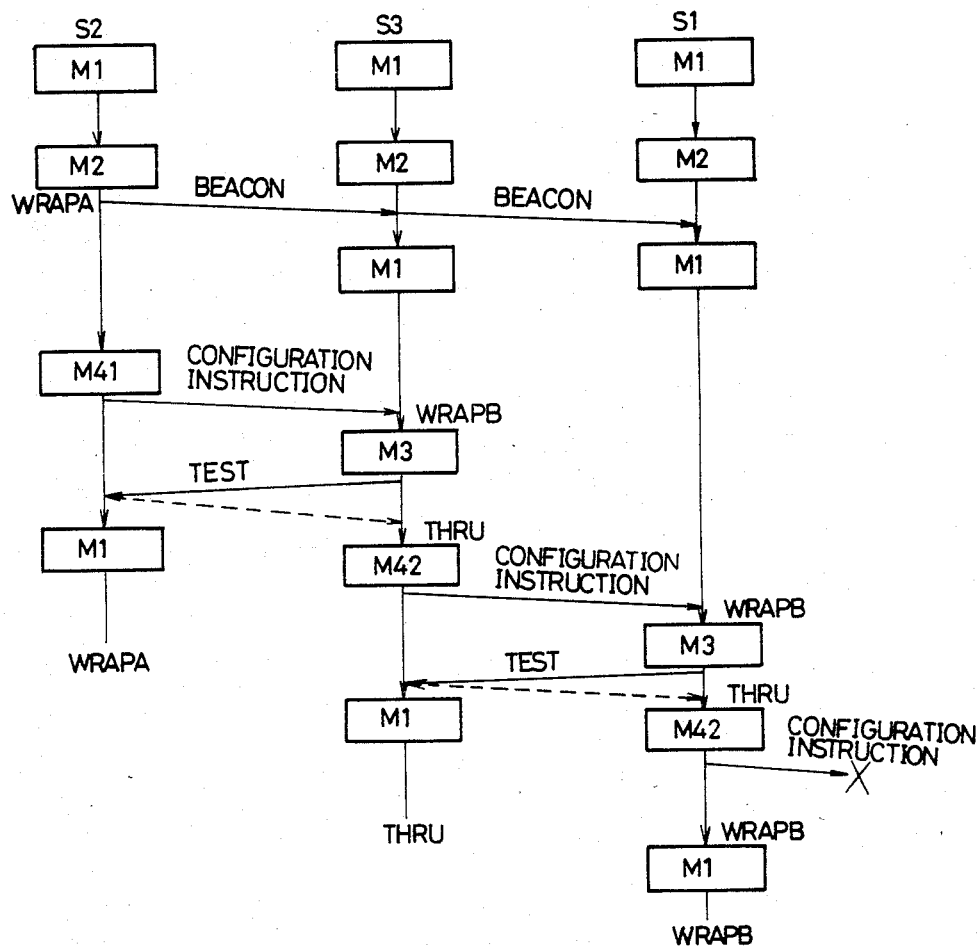
FIG. 3 is a schematic diagram useful for explaining a process of restoring the transmission line of FIG. 1.

FIG. 3 shows a process of correcting an information transmission fault between the stations S1 and S2 while the mode is changes as described above. In the figure, M1 stands for the normal mode, M2 the beacon mode, M3 the test mode, M41 the configuration instruction mode 1, and M42 the configuration instruction mode 2.

(1) When a control symbol time-out takes place, all the stations go to a beacon mode M2.

(2) Only the station S2, which is downstream of the location of an information transmission fault, remains in the beacon mode M2, while the other stations S1 and S3 receive a beacon frame from their upstream station S3 or S2 to return to the normal mode M1.

(3) The station S2, now in a beacon mode time-out, goes to a configuration instruction mode 1 M41 and transmits in the WRAPA state a configuration instruction frame to the adjacent downstream station S3.

(4) The station S3 receives the configuration instruction frame and goes to a test mode M3 and transmits in the WRAPB state a test frame to the adjacent upstream station S2.

(5) The station S2 receives the test frame and goes to the normal mode M1 in the WRAPA state.

(6) When the test frame transmission is completed, the station S3 goes to the configuration instruction mode 2 M42 and transmits in the THRU state a configuration instruction frame to the adjacent downstream station S1.

(7) The station S1 receives the configuration instruction frame and goes to a test mode M3 and transmits in the WRAPB state a test frame to the adjacent upstream station S3.

(8) The station S3 receives the test frame and goes to the normal mode M1 in the THRU state.

(9) When the test frame transmission is completed, the station S1 goes to a configuration instruction mode 2 M42 and transmits in the THRU state a configuration instruction frame to the downstream station S2.

(10) The configuration instruction frame is unable to reach the downstream station S2 because of the information transmission fault, and the station S1 experiences a time-out in the configuration instruction mode 2 M42. Consequently, it forms a WRAPB state and goes to the normal mode M1.

If there is an information transmission fault at the receiver of the station S2, the station S2 transmits in the configuration instruction mode 1 M41 a configuration instruction frame. However, the information is destroyed at its own receiver so that the transmission is unable to complete. Consequently, the station S2 experiences a test mode time-out and removes itself from the local area network. Thus, the fault is removed to restore the system.

Next, another system embodying the present invention will be described. In this embodiment, each station has four modes; normal and beacon modes, and two test modes 1 and 2. In the normal mode, the station performs a normal transmission reception operation while monitoring a control symbol. In the beacon mode, a station transmits to the adjacent downstream station a beacon frame informing that there is a fault on the transmission line. In the test mode 1, a station transmits, with its secondary line 2 looped back to its primary line 2, to the adjacent downstream station a test frame instructing that the primary output be connected to the secondary input and, after the test frame transmission is completed, transmits to the same station a test mode instruction frame instructing that the station transmit in a non-loopback state a test frame to the adjacent downstream station. In the test mode 2, a station transmits in a non-loopback state the above test frame and test mode instruction frame to the adjacent downstream station.

Figure 4:
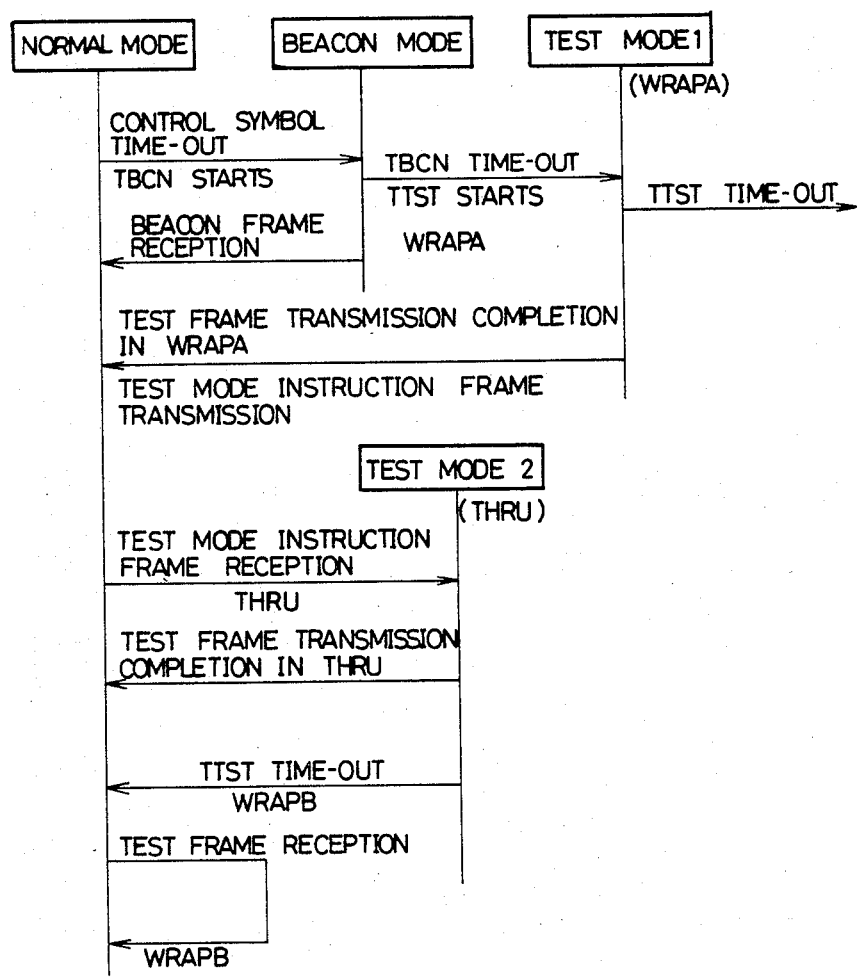
FIG. 4 is a schematic diagram illustrating the operational modes of another system according to the invention.
Figure 7:
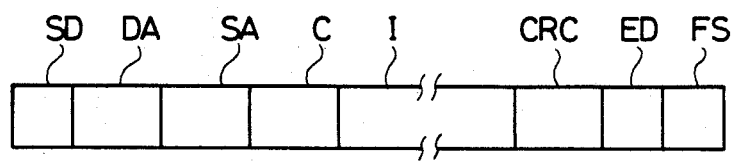
FIG. 7 shows the structure of a frame flowing along the transmission line of FIG. 6.
Figure 8:
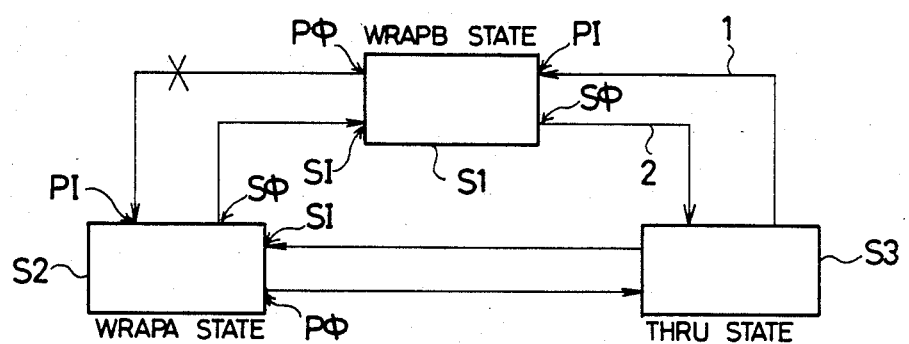
FIG. 8 is a schematic diagram showing a conventional system for correcting a carrier breakdown.
Figure 9:
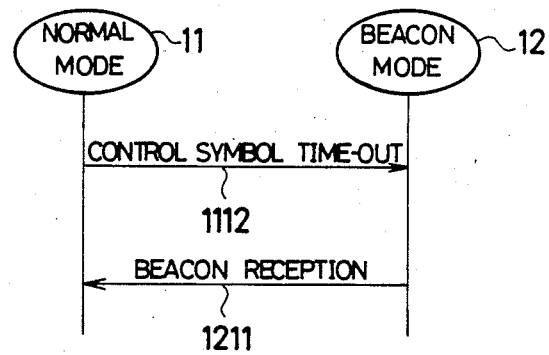
FIG. 9 is a schematic diagram of the operational modes useful for explaining how an information transmission fault is located.
Figure 10:
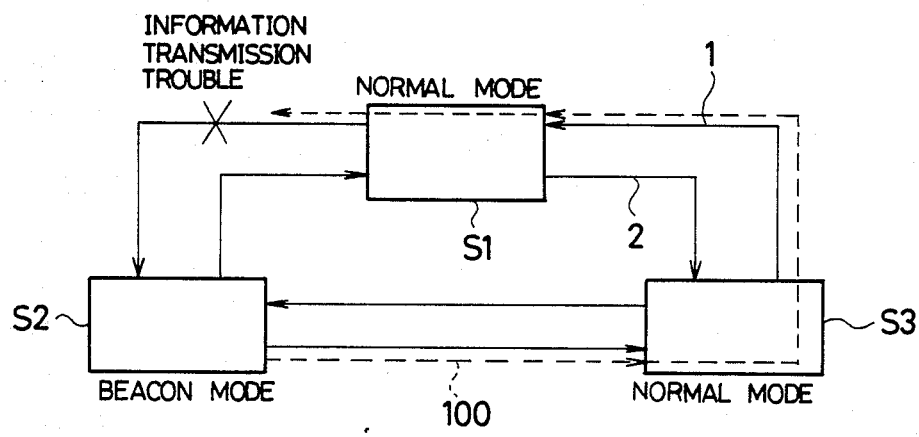
FIG. 10 is a schematic diagram of a conventional system for locating an information transmission fault.

How a station changes its mode will be described with reference to FIG. 4. When a control symbol is unable to detect within the predetermined time in the normal mode (control symbol time-out), each station goes to a beacon mode. When a station in the beacon mode receives no beacon frame from other stations in the predetermined time period (beacon mode time-out), the station goes to a test mode 1 and transmits a test frame in the WRAPA state.

When a station in the normal mode receives a test frame after a fault has been detected, the station effects loopback forming a WRAPB state in the same mode.

When a station in the normal mode receives a test mode instruction frame after a fault has been detected, the station goes to a test mode 2 and releases the loopback forming a THRU state.

When the test mode 1 continues for the predetermined time, bringing about a test mode 1 time-out, the station removes itself from the LAN.

When the test mode 2 continues for the predetermined time, bringing about a test mode 2 time-out, the station effects the above loopback forming a WRAPB state and goes to the normal mode.

The control means 1B controls the switching means 1A to change the above modes. The timer 1C measures time for the time-outs. When a new station is added to the LAN or a station is bypassed and removed from the LAN, the transmission line is disturbed temporarily and it takes some time for it to restore so that the interval of a time-out is determined by taking these facts into consideration.

FIG. 5 illustrates a process of restoring a transmission line from an information transmission fault which has occurred between the stations S1 and S2.

(1) All the stations experience a control symbol time-out and go to a beacon mode M2.

(2) Only the station S2, which is downstream of the location of the information transmission fault, holds the beacon mode while the other stations S1 and S3 receive a beacon frame from their upstream station, going to the normal mode M1.

(3) The station S2, now in a beacon time-out, goes to a test mode 1 M31 and transmits in the WRAPA state a test frame to the adjacent downstream station S3.

(4) The station S3 receives the test frame and goes to the WRAPB state without changing the mode.

(5) Upon completion of the test frame transmission, the station S2 transmits in the WRAPA state a test instruction frame and goes to the normal mode M1.

(6) The station S3 receives the test instruction frame, going to the test mode 2 M32 and transmits in the THRU state a test frame to the adjacent downstream station S1.

(7) The station S1 receives the test frame and goes to the WRAPB state without changing the mode.

(8) Upon completion of the test frame transmission, the station S3 transmits in the THRU state a test instruction frame and goes to the normal mode 1 M1.

(9) The station 1 receives the test instruction frame and goes to a test mode 2 M32 and transmits in the THRU state a test frame to the adjacent downstream station S2.

(10) Since the test frame is unable to reach the downstream station S2 because of the information transmission fault, the station S1 experiences a time-out in the test mode 1 and forms a WRAPB state, going to the normal mode M1.

If there is a similar fault at the receiver of the station S2, the station S2 transmits a test frame in the test mode 1 but cannot complete the transmission because the information is destroyed in its own station. Consequently, the station S2 experiences a test mode time-out and removes itself from the LAN. Thus, the trouble is removed and the system is restored.

In the above embodiments, only three stations are provided for simplicity, but the principle of the invention is applicable to a large number of stations. The above method is carried out be using the switching means, control means, and timer in each station, but it may be carried out with the use of a program, too.

While a preferred embodiment of the invention has been described using specific terms, such description is for illustrative purpose only, and it is to be understood that changes and variations may be made without departing from the spirit and scope of the invetion as defined by the following claims.

What is claimed is:

1. A method of restoring a transmission line by monitoring a control symbol generated at predetermined intervals in a local-area network having a plurality of stations connected with primary and secondary transmission lines to loop back the primary transmission line to the secondary transmission line when a fault occurs on the primary transmission line, wherein the improvement comprises switching said stations among the following five modes:

a normal mode in which a station performs a normal transmission and reception operation while monitoring said control symbol;

a beacon mode in which a station outputs to an adjacent downstream station a beacon frame indicating that there is a fault on said primary line;

a configuration instruction mode 1 in which a station outputs to an adjacent downstream station a configuration instruction frame instructing that a primary output be looped back to a secondary input, with a secondary output of said station looped back to a primary input of said station;

a configuration instruction mode 2 in which a station outputs to an adjacent downstream station a frame identical with said configuration instruction frame, with primary and secondary outputs and inputs of said station in a non-loopback state; and a test mode in which a station outputs to an adjacent upstream station a test frame for confirming that a primary line section between said station and said adjacent upstream station is in order, in such a manner that when a station in said normal mode detects a fault on said primary line, said station goes to said beacon mode;

when downstream and upstream stations in said beacon mode receive a beacon frame from said station and said downstream station, respectively, in a predetermined period of time, said downstream and upstream stations return to said normal mode;

when said station in said beacon mode receives no beacon frame from said upstream station in said predetermined period of time, said station goes to said configuration instruction mode 1 to transmit to said downstream station a configuration instruction frame instructing that a primary output be looped back to a secondary input;

when said downstream station in said normal mode receives said configuration instruction frame, said downstream station goes to said test mode to transmit a test frame to said station;

when said station in said configuration instruction mode 1 receives said test frame from said downstream station, said station goes to said normal mode, with its secondary output looped back to its primary input;

upon completion of transmission of said test frame, said downstream station goes to said configuration instruction mode 2, with said loopback between said primary output and said secondary input released;

when said configuration instruction mode 2 in said upstream station continues for said predetermined time, said upstream station loops back its primary output to its secondary input and goes to said normal mode; and upon reception of a test frame from said upstream station, said downstream station in said configuration instruction mode 2 goes to said normal mode in a non-loopback state, thereby providing a complete transmission line that is free of said fault.

2. A method of restoring a transmission line according to claim 1, wherein when said configuration instruction mode 1 continues for said predetermined time, said station removes itself from said local-area network.

3. A method of restoring a transmission line by monitoring a control symbol generated at predetermined intervals in a local-area network having a plurality of stations connected with primary and secondary transmission lines to loop back the primary transmission line to the secondary transmission line when a fault occurs on the primary transmission line, wherein the improvement comprises switching said stations among the following four modes;

a normal mode in which a station performs a normal transmission and reception operation while monitoring said control symbol, a beacon mode in which a station outputs to an adjacent downstream station a beacon frame indicating that there is a fault on said primary line, a test mode 1 in which a station outputs, with its secondary output looped back to its primary input, to an adjacent downstream station a test frame instructing that a primary output be looped back to a secondary input and, upon completion of transmission of said test frame, outputs to said adjacent downstream station a test instruction frame instructing that it return to a non-loopback state and output a test frame to an adjacent downstream station; and a test mode 2 in which a station outputs in a non-loopback state to an adjacent downstream station a test frame instructing that a primary output be looped back to a secondary input and, upon completion of the transmission of said test frame, outputs in a non-loopback state to said adjacent downstream station a test instruction frame instructing that it output a test frame to an adjacent downstream station, in such a manner that when a station in said normal mode detects a fault on said primary line, said station goes to said beacon mode;

when said station in said beacon mode receives no beacon frame from an upstream station in a predetermined period of time, said station goes to said test mode 1 to transmit to a downstream station a test frame and then a test instruction frame;

when said downstream station in said normal mode after said beacon mode received said test frame, said downstream station loops back its primary output to its secondary input;

when said downstream station receives said test instruction frame, said downstream station goes to a test mode 2 in a non-loopback state;

when said test mode 2 in said upstream station continues for said predetermined period of time, said upstream station loops back its primary output to its secondary input and goes to said normal mode, thereby providing a complete transmission line that is free of said fault.

4. A method of restoring a transmission line according to claim 3, wherein when said test mode 1 continues for said predetermined time, said station removes itself from said local-area network.

* * * * *

UNITED STATES PATENT AND TRADEMARK OFFICE
CERTIFICATE OF CORRECTION

PATENT NO. : 4,847,610

DATED : July 11, 1989

INVENTOR(S) : Ozawa et al.

It is certified that error appears in the above-identified patent and that said Letters Patent is hereby corrected as shown below:

Title page:

In Assignee; change "Mitsubishi Denki K.K., Tokyo, Japan" to --Nippon Telegraph & Telephone Corp. and Mitsubishi Denki Kabushiki Kaisha, both of Tokyo, Japan--.

Signed and Sealed this

Twenty-sixth Day of June, 1990

Attest:

HARRY F. MANBECK, JR.

*Attesting Officer*      *Commissioner of Patents and Trademarks*